United States Patent [19]

Elineau

[11] 4,278,377

[45] Jul. 14, 1981

[54] METHOD OF AND APPARATUS FOR STACKING CHANNEL BARS

[75] Inventor: Hubert Elineau, Versailles, France

[73] Assignee: MecanARBED S.a.r.L., Luxembourg, Luxembourg

[21] Appl. No.: 72,470

[22] Filed: Sep. 4, 1979

[30] Foreign Application Priority Data

Sep. 5, 1978 [FR] France .................. 78 25513

[51] Int. Cl.³ .................. B65G 57/081; B65G 57/18
[52] U.S. Cl. .................. 414/30; 198/430; 198/488; 414/56; 414/60; 414/74; 414/786
[58] Field of Search .................. 414/30, 55, 56, 60, 414/63, 74, 786; 198/425, 430, 488, 774

[56] References Cited

U.S. PATENT DOCUMENTS

| | | | |
|---|---|---|---|
| 2,559,460 | 7/1951 | Peterson .................. | 414/56 |
| 3,452,884 | 7/1969 | Tanqueray .................. | 414/56 X |
| 3,957,163 | 5/1976 | Tänzler .................. | 414/56 X |
| 4,109,801 | 8/1978 | Uchida et al. .................. | 414/56 |

FOREIGN PATENT DOCUMENTS 1183020 12/1964 Fed. Rep. of Germany ............. 414/74
1594003  7/1970 France .................. 414/74

Primary Examiner—Leslie J. Paperner
Attorney, Agent, or Firm—Karl F. Ross

[57] ABSTRACT

A succession of channel bars having widths that lie within a range below a predetermined maximum bar width is fed to a pickup station with the bars generally coplanar, parallel, and in edge contact. In the station a group of the bars is picked up by a pair of pivotal combs which are then pivoted about axes perpendicular to the group of bars to space the bars apart on centers that themselves are spaced apart substantially by the maximum bar width. Then the picked-up and arrayed bars are deposited in a stacking station substantially without changing the spacing between them. Another group of such bars which, however, numbers one less than the preceding group, is similarly picked up and arrayed at the maximum-width spacing, then is inverted and deposited between the previously deposited bars. These steps are repeated to form a neat stack.

14 Claims, 19 Drawing Figures

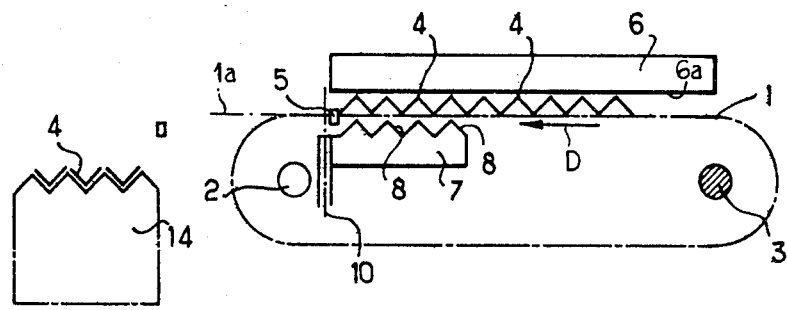
FIG_1
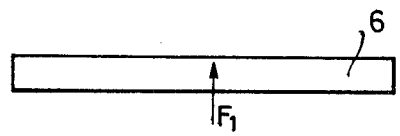
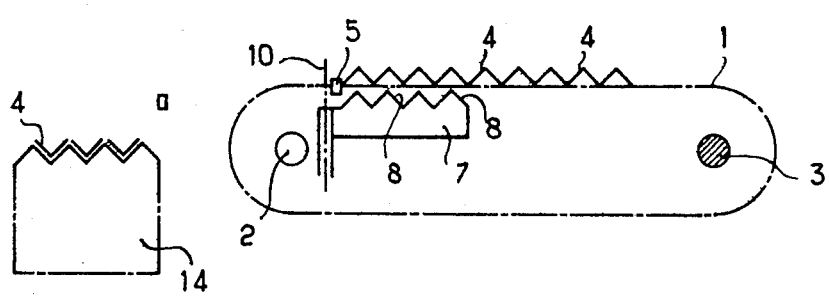
FIG_2
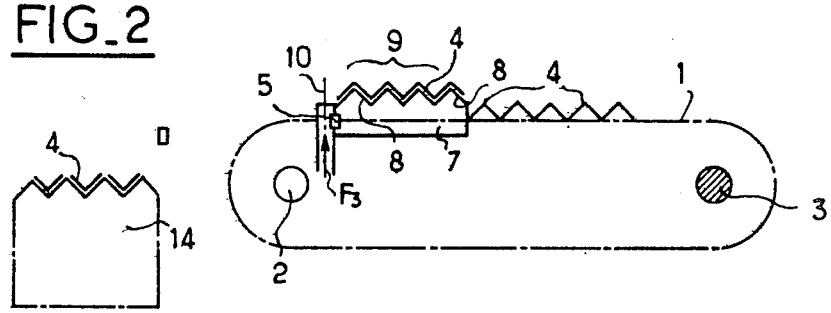
FIG_3
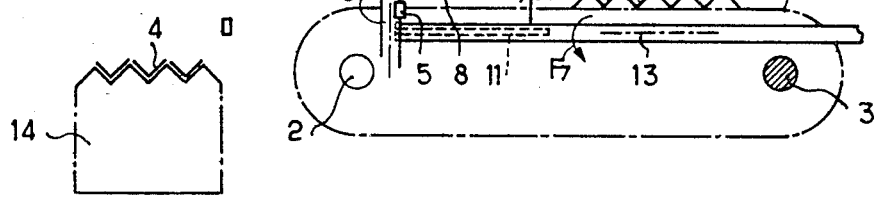
FIG_4

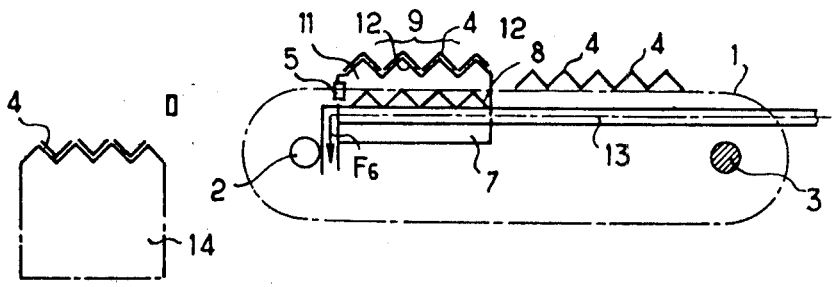
FIG.5
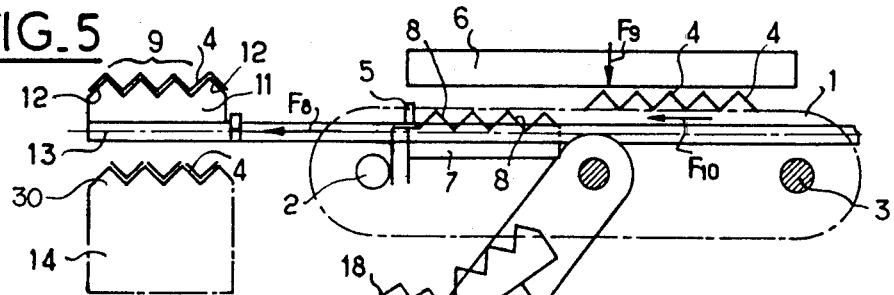
FIG.6
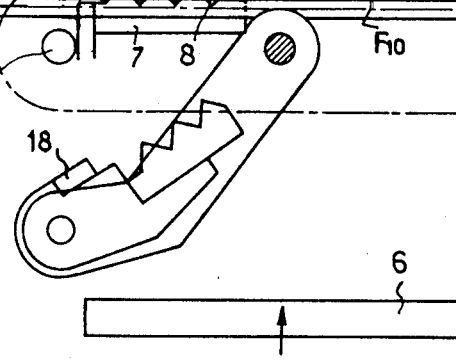
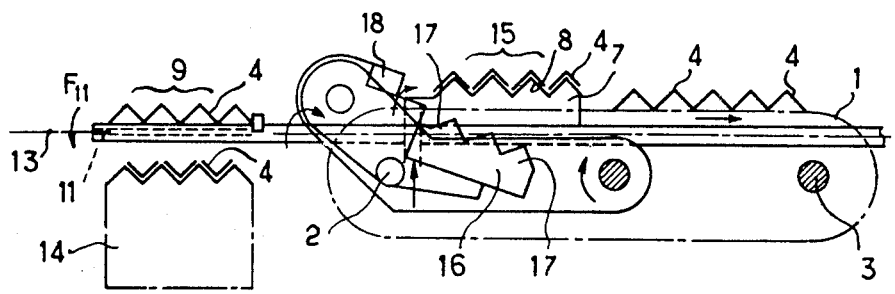
FIG.7
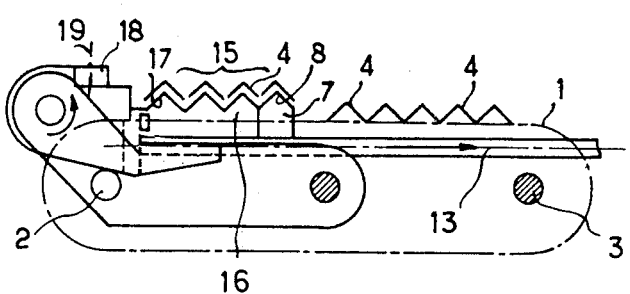
FIG.8

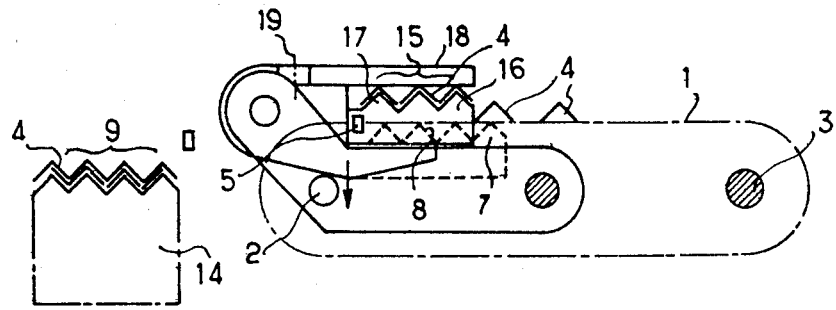
FIG_9
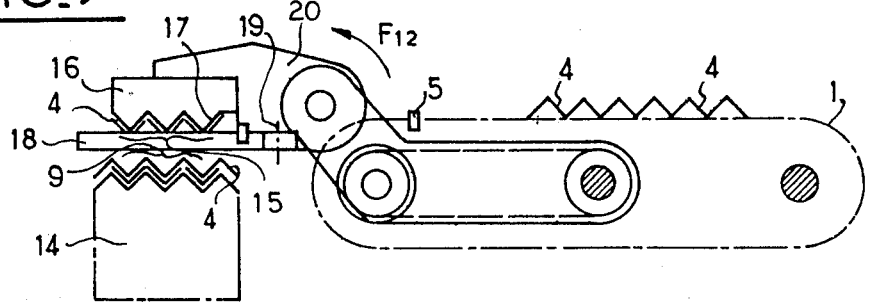
FIG_10
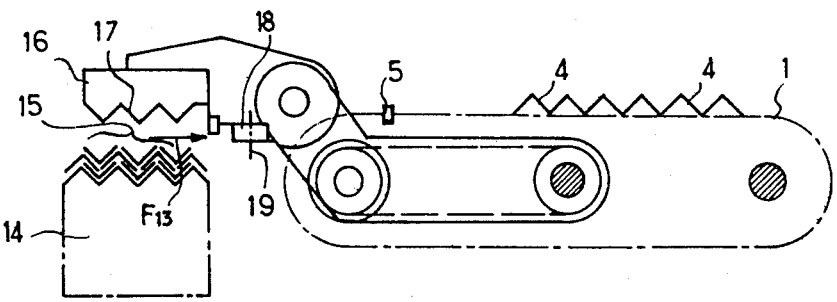
FIG_11
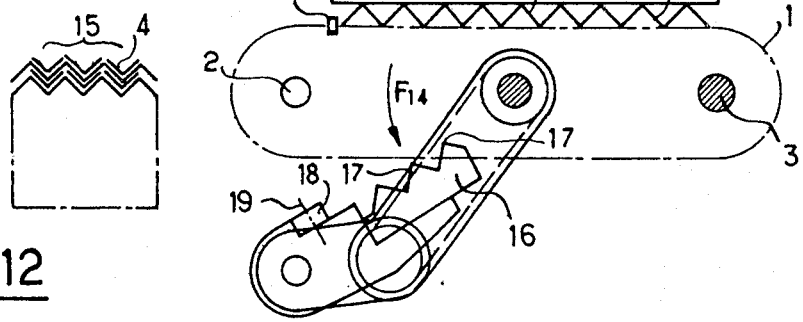
FIG_12

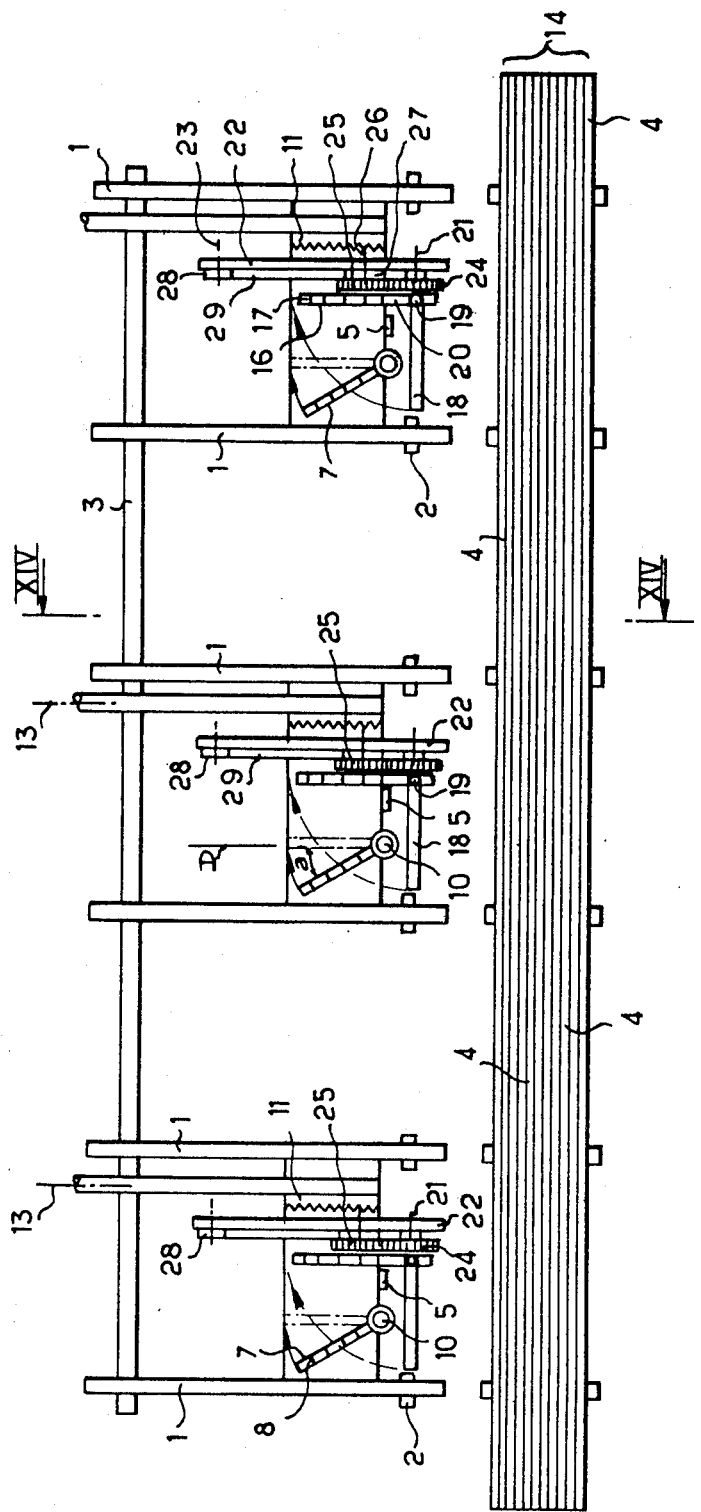

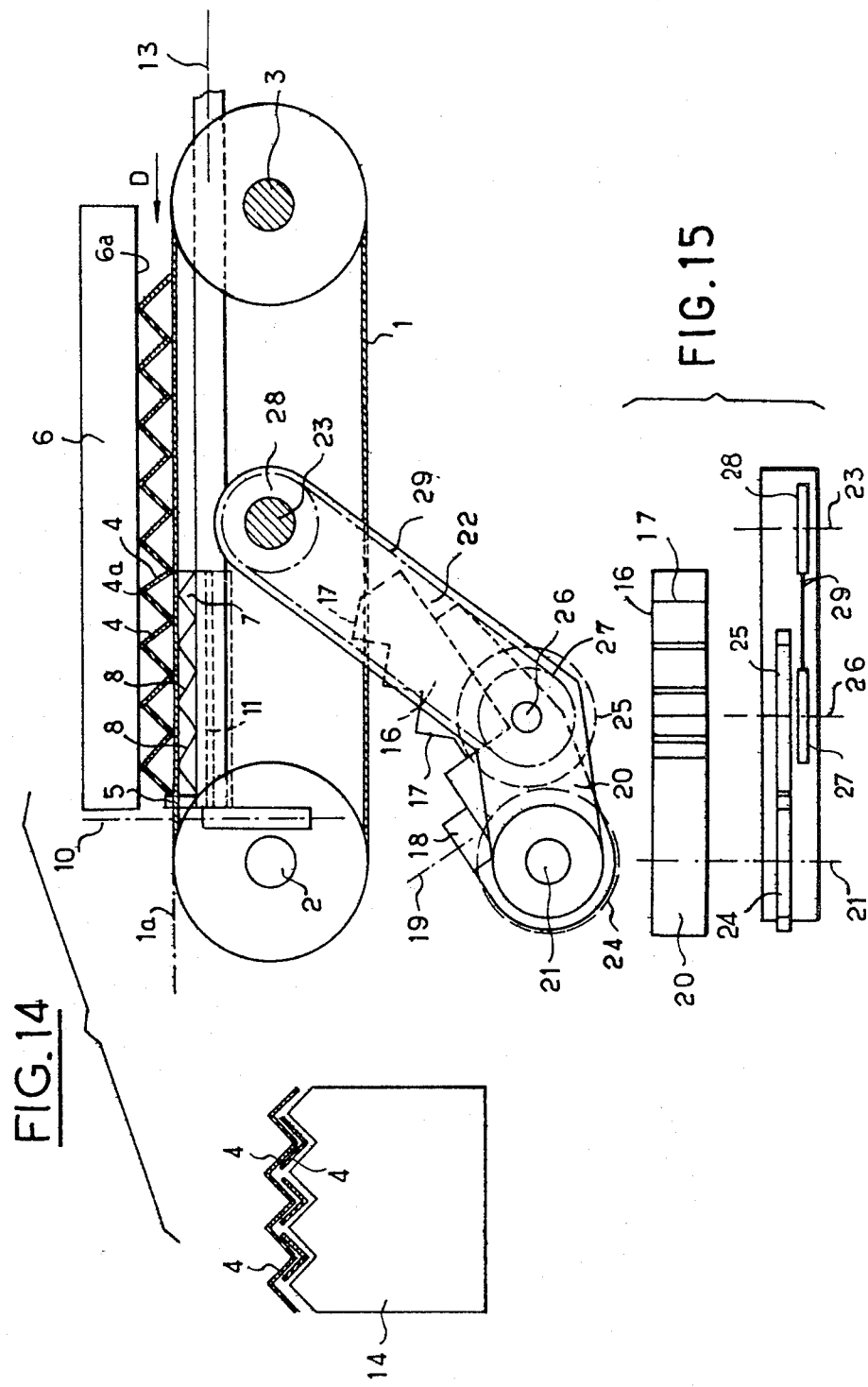

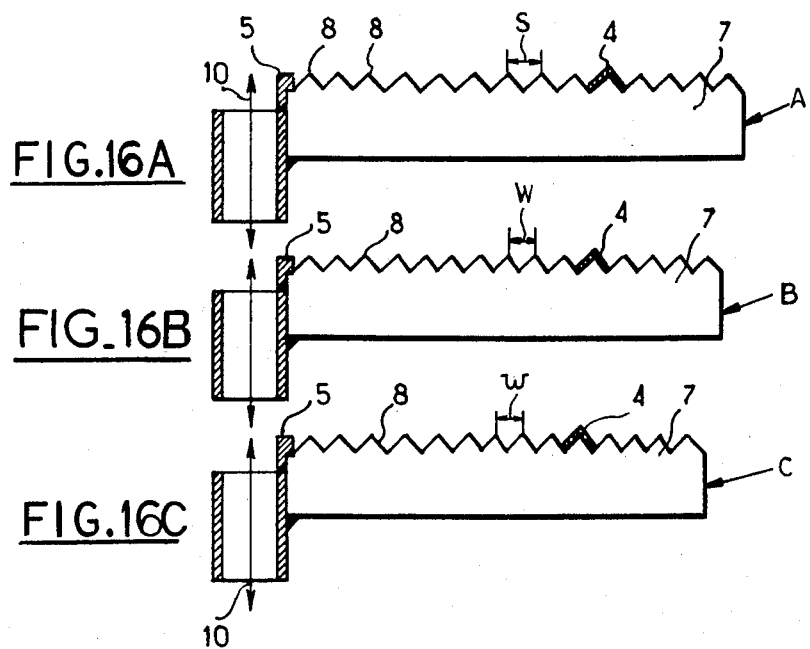
FIG.16A
FIG.16B
FIG.16C
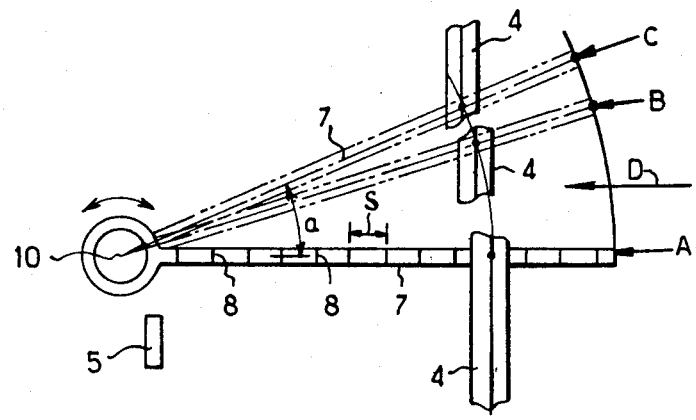
FIG.17

METHOD OF AND APPARATUS FOR STACKING CHANNEL BARS

FIELD OF INVENTION

The present invention relates to a method of and apparatus for stacking elongated bars. More particularly this invention concerns the stacking of channel bars whose widths lie within a range below a predetermined maximum bar width.

BACKGROUND OF THE INVENTION

In the production of U- or V-section channel bars or of T-section bars the bar widths normally vary from bar to bar within a range, lying between a minimum bar width and a maximum bar width. In order to form a stack of such bars a succession of the bars is fed to a pickup station with the bars generally coplanar, parallel, and in edge contact in the pickup station. At this station a pickup device, normally formed by an electromagnet assembly, picks up a predetermined number of the bars and deposits them in a stacking station.

The principal disadvantage of this system is that if the group of bars picked up contains a plurality of bars having the minimum bar width, it is possible for the group to have too many bars, or similarly if a few of the bars are relatively wide the group picked up can number one bar too few. The obvious result is that the stack thus formed will have an incorrect number of bars.

This above-discussed problem is compounded when the bars are of the channel type, that is of U section, V section, or C section. With such bars it is normally necessary to invert every other layer of bars in the stack, with the alternate layers each numbering one less bar than the layers sandwiching it. In such a stack, if a given layer has one bar too few or too many, the result will be an incorrectly constituted stack that will normally require complete manual restacking.

Another disadvantage of the known system is that if the bars overlap each other occasionally as they are picked up, when deposited the bars are irregularly positioned in the layers of the stack. The result of this is, of course, that the layers will not lie flatly or neatly on top of each other, and that it will be impossible to form a neat planar layer on top of such an irregularly constituted layer.

Another disadvantage of this machine is that the electromagnets normally employed to hold the bars, when same are magnetically attractable, are bulky and very heavy, and at the same time require considerable energy to use. Thus the known stacking machines not only are expensive to make and operate, but at the same time function imperfectly.

OBJECTS OF THE INVENTION

It is therefore an object of the present invention to provide an improved method of and apparatus for stacking elongated bars.

Another object is to provide such a method and apparatus which will form relatively neat stacks of bars whose widths vary within a relatively wide range.

A further object is to provide a machine for forming such stacks which is relatively simple and which can function fully automatically.

SUMMARY OF THE INVENTION

These objects are attained according to the instant invention in an apparatus wherein a succession of the bars is fed into a pickup station with the bars generally coplanar, parallel, and in edge contact with one other in the station. A group of the bars is picked up at the station and then is arrayed on centers spaced apart substantially by the maximum bar width. The thus picked-up and arrayed bars are then deposited in a stacking station substantially without changing the spacing between them. The picking up and arraying is carried out according to this invention by means of at least two combs, each having a row of formations complementary to the cross sections of the bars. These combs are jointly pivotal about respective upright axes generally perpendicular to the group being picked up and arrayed, so that the angle the combs form with the bars of the group being picked up determines the spacing between adjacent bars in this group. Normally the angles which the combs form with the bars is increased once the bars have been picked up, so that the picked-up bars of the group are then spaced somewhat apart, with most of the bars in fact lying completely out of edge contact with the flanking bars. Such a system ensures that the bars will be deposited in each layer in the stack with perfect uniformity.

According to further features of this invention the combs for arraying and picking up the bars from the conveyor are vertically displaceable and pivotal. Associated with these pickup and arraying combs is a pair of stacking combs whose formations are spaced apart on centers spaced apart at the maximum bar width. These stacking combs may be mounted for displacement pivotally about and axially along respective axes extending parallel to and underneath the conveyor and parallel to the transport direction. After the pickup and arraying combs have a group of bars at the desired spacing and ready for stacking, the stacking combs are pivoted about their respective axes from reclined or horizontal positions to upright positions so as to bring their formations above the plane defined by the upper surface of the conveyor. The pickup combs the drop back down to deposit the picked-up and arrayed bars onto the stacking combs which are thereupon jointly axially displaced to move the bars into the stacking station. At the stacking station the stacking combs are pivoted back down into their horizontal positions sequentially from one end to the other so as gently to deposit the bars in the stacking station without changing their transverse spacing.

When the bars are of the channel type it is normally necessary to invert every other layer of bars in the stack so as to form a relatively compact and stable stack. This is achieved according to the instant invention by providing another set of inverting combs whose formations are spaced apart, again, at the maximum bar width, and which are pivotal about a horizontal axis perpendicular to the transport direction and lying between the pickup and stacking stations. These inverting combs are used instead of the stacking combs for every other layer, and the inverting combs each have one formation less than the pickup combs. The pivot axis for the inverting combs is so spaced that although the formations of the inverting combs are directly in registration with those of the pickup and arraying combs, when the inverting combs are pivoted through 180° to deposit the bars they are offset by half of the maximum bar width form the underlying row so as to interleave them with the underlying row. These inverting combs are provided with holddown elements in the form of pivotal arms or bars which hold the bars picked up by the inverting combs from the pickup combs in place once the inverting combs are inverted. These holddown elements are sequentially moved out from underneath the bars on the inverting combs so as gently to deposit the inverted group of bars on the underlying group of bars.

The system according to the instant invention is particularly usable with channel-type bars. It is, however, equally possible for the arrangement to operate with bars of any cross section, even including cylindrical bars, so long as the bars are relatively rigid so that they can be handled. Of course, as the bar cross section is changed, the formations on the various handling combs must similarly be changed to be complementary to them. Nonetheless, even when the bars are of regular section so that they actually do not need to be inverted, it is useful to use an arrangement of inverting combs as described above when alternate layers of the stack to be formed are to be staggered or offset. All such obvious expedients are intended to lie within the scope of the instant invention.

BRIEF DESCRIPTION OF THE DRAWING

FIGS. 1-12 are largely schematic views illustrating the sequence of operations of the method and apparatus according to this invention;

FIG. 13 is a large-scale top view of a portion of the apparatus according to this invention;

FIG. 14 is a section taken along line XIV—XIV of FIG. 13;

FIG. 15 is a top view of a detail of the structure shown in FIG. 14;

FIGS. 16A, 16B and 16C are side views illustrating the operation of another portion of the machine according to this invention; and FIG. 17 is a top view illustrating further the operation of the detail shown in FIGS. 16A-C.

SPECIFIC DESCRIPTION

The apparatus according to this invention has a conveyor formed by six parallel endless chains 1 each spanned over an idler wheel 2 and a drive wheel 3, and together forming a parallel support plane 1a adapted to carry a succession of like V-section bars 4 with their corners 4a directed upwardly. The drive wheels 3 are synchronously rotatable in both directions, but normally are operated to displace the bars 4 in a normal forward transport direction D, so that the leading bar 4 engages three abutments 5 (see FIG. 13).

Provided immediately above the plane 1a defined by the upper reaches of the chains 1 is a holddown or guide 6 having a lower surface 6a parallel to the plane 1a. This surface 6a is normally spaced above the plane 1a by a distance equal to only slightly more than the overall height of the bars 4, so that the bars 4 will not be able to pile up on top of each other. The bars 4 are able to slip on chains 1 so that once the furthest downstream bar 4 engages the abutments 5, the following bars 4 will move into close edge-wise juxtaposition with one another.

Three spacer and lifter combs 7 are vertically displaceable underneath the plane 1a and each have a row of teeth formations 8 complementary to the cross sections of the bars 4. Each of these combs 7 is carried on a respective vertical axle 10 and can be displaced vertically by the respective axle 10 which itself can be rotated about its vertical axis as will be described below.

The basic function of the structure described above is to lift a group 9 of a predetermined number n of the bars 4 off the conveyor chain 1. To this end, as shown in FIGS. 14, 16A-C, and 17 the teeth 8 are on centers spaced apart by a distance S which is somewhat larger than the maximum width W that any of the bars 4 has measured in a direction perpendicular to its length. It should be understood that due to standard manufacturing tolerance deviations the bars will have widths varying some of this maximum width W down to a minimum width w, it being this very variation in actual bar width that hitherto has created such difficulties in forming neat stacks of such bars. The effective spacing of the teeth 8 measured in the direction D will, however, be a function of the angle a formed between the combs 7 and this direction D, the effective spacing being smaller as the angle a increases. Thus when one of the combs 7 is parallel to the direction D, as shown in FIG. 16A and indicated at A in FIG. 17 the effective spacing will be at a maximum, this spacing being smaller when the angle a is somewhat greater as shown in FIG. 16B and at B in FIG. 17, or even less when the angle is increased further as shown in FIG. 16C and at C in FIG. 17.

In use the lifter-spacer combs 7, which are shown to have substantially fewer teeth in FIGS. 1-12 than in the remaining figures for ease of illustration, are set so that the effective spacing measured in the direction D is equal to the minimum bar width w or slightly more. This is achieved, of course, by rotating the axles 10 jointly to the required angle a. In this position these combs 7 are lifted up under the array of bars 4 to lift off the group 9. Prior to such lifting the guide 6 is raised in the direction of arrow F1 from the position of FIG. 1 to the position of FIG. 2. Raising of the combs 7 in the direction of arrow F3, as shown in FIG. 3, will therefore lift up the group of bars 9.

Thereafter as shown in FIG. 4 the wheels 3 are reversed slightly to widhtraw the remaining bars 4 backwardly in the direction of arrow F4. The axles 10 are all then jointly rotated as indicated by arrow F5 so that the bars 4 are spaced apart in the direction D on centers in turn spaced apart by the maximum bar width W. This ensures that the bars 4 of the group 9 are equispaced apart, allowing for the widest possible bars.

Thereafter, as shown in FIG. 5 three stacking combs 11 having teeth 12 lying on centers spaced apart by the maximum width W are brought into action. These combs 11 are carried on respective shafts 13 extending parallel to the plane 1a and parallel to the direction D. The shafts 13 are rotatable about their longitudinal axes and also axially displaceable. During the operations illustrated in FIGS. 1-4 the combs 11 are, however, aligned in a common parallel plane so that they lie below the plane 1a.

Once the proper spacing has been set between the bars of the group 4 as shown in FIG. 4, however, rods 13 are all rotated synchronously through 90° as illustrated by arrow F7 in FIG. 4 to bring the teeth 12 up above the plane 1a as illustrated in FIG. 5. The combs 7 are then dropped downwardly as indicated by arrow F6. This action leaves the group 9 of bars 4 resting on top of the combs 11 and resting on centers spaced apart by the distance W.

Thereafter as shown in FIG. 6 the axles 13 for the combs 11 are well advanced in the direction D as indicated by arrows F8 to a position above a stacking station 14 itself formed with teeth 30 having centers spaced apart by the distance W. The shafts 13 are then sequentially rotated through 90° as indicated by arrow F11 in FIG. 7 and are then sequentially withdrawn back against the direction F8, gently depositing the group 9 of bars 4 on the stacking station 14.

Meanwhile as shown in FIG. 6 the conveyor 1–3 has been restarted to advance more bars 4 in the direction F10 up into engagement with the abutment 5, and the guide 6 has been lowered down in the direction F9 to a position spaced somewhat above the plane 1a.

The above-discussed sequence of steps and equipment can be used equally well with bars 4 or virtually any section. In the event that round or square-section bars are to be stacked it is merely necessary to form appropriate complementary teeth 8, 12, and 13 on the respective elements.

When angle-irons such as shown in the drawing are to be stacked, however, or when T-section or U-section bars 4 are being stacked, it is advisable to have the bars 4 in alternate layers of the stack being formed to be inverted. This is achieved according to the instant invention by means of three inverter combs 16 having teeth 17 spaced apart identically to the teeth 12, but numbering one less than the number of teeth 12. Each such inverter comb 16 is formed as shown in FIGS. 14 and 15 on an arm 20 pivotal about an axle 21 on the end of a bent arm 22 itself pivoted on an axle 23 on the apparatus housing. A gear 24 is fixed on the arm 20 and meshes with a gear 25 rotatable on an axle 26 carried at the elbow of the bent arm 22. This axle 26 carries a sprocket 27 connected to another sprocket 28 on the shaft 23 by means of the chain 29. Thus the entire arm 22 can be rotated about a horizontal axis between and coplanar with the axes of the wheels 2 and 3, and the sprocket 28 can be driven to pivot the combs 16 about the axle 21. In addition each arm 22 carries a holddown element 18 pivotal on its free end about an axis 19.

Thus as shown in FIG. 6 after one layer of bars 4 has been deposited on the stacking station 14 another group 15 of bars 4 is picked up and spaced apart by the combs 7 in the manner discussed with reference to FIG. 4. Thereafter, however, instead of being picked off the combs 7 by the combs 11, the combs 6 are swung up as shown in FIG. 8 and the combs 7 are dropped as shown in FIG. 9 so that all but one of the bars 4 carried by the combs 7 remains suspended on the teeth 17 of the combs 16. Meanwhile the holddowns 18 are pivoted around their axes 19 to hold these bars 4 on the teeth 17.

The arms 20 are then pivoted over as indicated by arrow F12 in FIG. 10 so that the bars 4 carried between the combs 16 and the holddowns 18 are positioned upside down above the previously formed stack of bars 4 in the station 14.

Thereafter as shown in FIG. 10 the holddowns 18 are sequentially pivoted out from underneath the bars 4 from one end to the other, so as gently to deposit the bars 4 on top of the layer of bars 4 in the station 14.

Thereafter, as shown in FIG. 12, the entire arm 22 is pivoted down as indicated at arrow F14 and the end arm 20 is pivoted back over into the starting position. From this position the entire sequence of operations illustrated in FIGS. 1–12 can be repeated.

The machine according to the instant invention can therefore readily easily be set up so as to form neat stacks of bars whose widths measured perpendicular to their lengths vary from bar to bar within a relatively wide range. The system can do this by automatically spacing the bars apart on centers in turn spaced apart by a distance equal to the maximum bar width. Thereafter the stack is formed, without any possibility of the bars overlapping each other, since they will always be spaced apart by a distance allowing even the widest bars to fit. The system can readily be set up for bars of different cross sections, and different maximum and minimum widths.

I claim:

1. A method of stacking elongated bars whose widths are equal at most to a predetermined maximum bar width, said method comprising the steps of:
    feeding a succession of said bars to a pickup station with said bars generally coplanar, parallel, and in edge contact in said pickup station;
    picking up a group of said bars from said station;
    arraying the picked-up bars of said group parallel to one another and on centers spaced apart substantially by said maximum bar width by first supporting said bars on at least two combs each having a plurality of formations complementary to said bars with each bar resting on one such formation of each comb and second by pivoting said combs about respective axes generally perpendicular to said group with said combs extending generally parallel to said group but transverse to the bars of said group; and
    depositing the picked-up and arrayed bars in a stacking station substantially without changing the spacing between them.

2. The method defined in claim 1, further comprising the steps of picking up, arraying, and depositing with a second such group of bars, said second group of bars being deposited on the first-mentioned group of bars.

3. The method defined in claim 2 wherein said second group of bars has one less bar than said first group.

4. The method defined in claim 3, further comprising the step of inverting said second group of bars before depositing same on said first group, said bars being of irregular cross section.

5. The method defined in claim 4 wherein said bars are channels, said bars of said first group being deposited in said stacking station with said channels opening in one vertical direction and said second group being deposited with said channels staggered between said first group and opening in the opposite vertical direction.

6. An apparatus for stacking elongated bars whose widths are equal at most to a predetermined maximum bar width, said apparatus comprising:
    conveyor means for feeding a succession of said bars to a pickup station with said bars generally coplanar, parallel, and in edge contact in said pickup station;
    means including at least two combs each having a plurality of formations complementary to said bars for picking up a group of said bars from said station with each bar resting on one such formation of each of said combs;
    arraying means for pivoting said combs about respective axes generally perpendicular to said group for arraying the picked-up bars parallel to one another and on centers spaced apart substantially by said maximum bar width; and
    means for displacing the picked-up and arrayed bars from said combs to a stacking station substantially without changing the spacing between the picked-up and arrayed bars.

7. The apparatus defined in claim 6 wherein said formations of said combs are spaced apart on said combs on centers spaced apart by distances greater than said maximum widths.

8. The apparatus defined in claim 7 wherein the angle included between said combs and said bars of said group is increased by said arraying means for arraying of said bars.

9. The apparatus defined in claim 6 wherein said means for displacing includes at least two stacking combs having formations on centers spaced apart by said maximum width, said pickup combs being displaceable from said pickup station to said stacking station.

10. The apparatus defined in claim 9 wherein said stacking combs are pivotal about axes generally parallel to said group between upstanding positions with the formations of said stacking bars directed upwardly to receive said bars from the arraying combs and horizontal positions.

11. The apparatus defined in claim 9 wherein the arraying combs are vertically displaceable relative to said conveyor means for picking up said group of bars therefrom.

12. The apparatus defined in claim 9, further comprising a second such pair of stacking combs having formations numbering one less per comb than the formations of the first-mentioned pickup combs, and means with said second stacking combs, for retaining the picked-up bars on said second stacking comb, for inverting the picked-off bars with said second stacking combs and thereby depositing the picked-off bars on said stacking station.

13. The apparatus defined in claim 12 wherein said second stacking combs are pivotal about a horizontal axis between a position with the respective formations in said pickup station and a position in said stacking station.

14. The apparatus defined in claim 6 wherein said stacking station is provided with formations complementary to said bars and spaced apart on centers at said maximum width.

* * * * *